(12) United States Patent
Rampal (10) Patent No.: US 11,380,010 B2
(45) Date of Patent: Jul. 5, 2022

(54) IMAGE PROCESSING DEVICE, IMAGE PROCESSING METHOD, AND IMAGE PROCESSING PROGRAM

(71) Applicant: NEC Corporation, Tokyo (JP)

(72) Inventor: Karan Rampal, Tokyo (JP)

(73) Assignee: NEC CORPORATION, Tokyo (JP)

( * ) Notice: Subject to any disclaimer, the term of this patent is extended or adjusted under 35 U.S.C. 154(b) by 19 days.

(21) Appl. No.: 16/766,479

(22) PCT Filed: Nov. 27, 2017

(86) PCT No.: PCT/JP2017/042365
§ 371 (c)(1),
(2) Date: May 22, 2020

(87) PCT Pub. No.: WO2019/102608
PCT Pub. Date: May 31, 2019

(65) Prior Publication Data
US 2020/0380721 A1    Dec. 3, 2020

(51) Int. Cl.
| | |
|---|---|
| G06K 9/00 | (2022.01) |
| G06T 7/73 | (2017.01) |
| G06T 7/77 | (2017.01) |
| G06K 9/62 | (2022.01) |
| G06V 10/50 | (2022.01) |

(52) U.S. Cl.
CPC .............. *G06T 7/74* (2017.01); *G06K 9/6215* (2013.01); *G06K 9/6262* (2013.01); *G06T 7/77* (2017.01); *G06V 10/50* (2022.01); *G06T 2207/20072* (2013.01); *G06T 2207/20081* (2013.01)

(58) Field of Classification Search
CPC ... G06T 7/74; G06T 7/77; G06T 2207/20072; G06T 2207/20081; G06K 9/4642; G06K 9/6215; G06K 9/6262; G06K 9/00664
USPC ....................................................... 382/159
See application file for complete search history.

(56) References Cited

U.S. PATENT DOCUMENTS

| | | | |
|---|---|---|---|
| 8,107,726 B2* | 1/2012 | Xu ........................ | G06K 9/6256 382/173 |
| 2007/0211938 A1 | 9/2007 | Tu et al. | |
| 2012/0155751 A1 | 6/2012 | Aoba | |
| 2016/0012277 A1 | 1/2016 | Tate et al. | |
| 2017/0154212 A1 | 6/2017 | Feris et al. | |

FOREIGN PATENT DOCUMENTS

| | | |
|---|---|---|
| JP | 2009-157767 A | 7/2009 |
| JP | 2012-128744 A | 7/2012 |
| JP | 2015-187769 A | 10/2015 |

(Continued)

OTHER PUBLICATIONS

Kumar, Vijay, et al. "Pose-Aware Person Recognition." arXiv preprint arXiv: 1705.10120 (2017). (Year: 2017).*

(Continued)

*Primary Examiner* — Jonathan S Lee
(74) *Attorney, Agent, or Firm* — Sughrue Mion, PLLC (57) ABSTRACT

An image processing device 10 includes: an extraction means 11 which extracts sub patches from a given plurality of input images combined pose probabilities; a filtering means 12 which filters the extracted sub patches and the pose probabilities; and a combining means 13 which combines the filtered sub patches and the filtered pose probabilities.

20 Claims, 9 Drawing Sheets

(56) References Cited

FOREIGN PATENT DOCUMENTS

JP    2016-018538 A    2/2016
JP    2017-027176 A    2/2017

OTHER PUBLICATIONS

International Search Report for PCT Application No. PCT/JP2017/042365, dated Jan. 9, 2018.
Written opinion for PCT Application No. PCT/JP2017/042365, dated Jan. 9, 2018.
L. Zheng, Y. Huang, H. Lu, and Y. Yang, "Pose Invariant Embedding for Deep Person Re-identification," arXiv preprint, 2017, arXiv:1701.07732. Australia.
Y. J. Cho and K. J. Yoon, "Improving Person Re-identification via Pose-aware Multi-shot Matching," 2016 IEEE Conference on Computer Vision and Pattern Recognition (CVPR), 2016, pp. 1354-1362. South Korea.
1 Japanese Office Action for JP Application No. 2020-526658 dated Jul. 27, 2021 with English Transtation.
Japanese Office Action for JP Application No. 2020-526658 dated Mar. 1, 2021 with English Translation.

* cited by examiner

IMAGE PROCESSING DEVICE, IMAGE PROCESSING METHOD, AND IMAGE PROCESSING PROGRAM

This application is a National Stage Entry of PCT/JP2017/042365 filed on Nov. 27, 2017, the contents of all of which are incorporated herein by reference, in their entirety.

TECHNICAL FIELD

The present invention relates to an image processing device, an image processing method, and an image processing program, and more particularly to an image processing device, an image processing method, and an image processing program to extract a feature which is guided by the pose of the object for recognition purpose.

BACKGROUND ART

Object recognition is the process of determining whether an object is present in a plurality of given images. The goal is to output a label, an ID or a score which shows the confidence in the ability to recognize the object. The object in this task can be human, type of animal, automobile etc. There are many applications for object recognition such as in surveillance, human computer interface, biometrics etc. Object recognition consists of mainly three major steps. The first step is the object detection. Given a plurality of images, the object is detected and a sub region is selected. Second step is feature extraction. Given a sub region containing the object or a plurality of regions containing the object, features are extracted from it. Third step is metric learning, where using a learnt metric. For example, the distance between a plurality of features is computed as the learnt metric. Using this distance a decision is made about the object and an ID, a label or a score is output.

However, one of the most challenging problems for object recognition has been a pose of the object. The pose is defined as the orientation of the object with respect to the image capturing device. As the pose of the object varies the features also vary, giving different output scores for same object at different poses. For example, in the case of human recognition, humans can move in different directions with respect to the camera. Hence the pose of the human will vary from frontal to profile to back to profile. This change in the pose due to object moving will result in different features being extracted for the same object. Hence it is important to solve this problem.

Pose variation is a hard problem and is still an open challenge to solve. Most of the techniques try to improve the recognition performance by adding more data which captures all the possible variations for an object. While other techniques focus on improving the metric so pose variation within an object is minimized. There is not a lot of effort to directly learn features which are robust to pose variation. Hence there is still a need for techniques which can solve the pose variation problem in recognition tasks.

One of the techniques for adding pose awareness for object recognition is by using the pose information during training and model generation, see PTL 1. In PTL 1, the pose information is supplied as a ground truth to train a pose estimator. This pose estimator gives the pose of an input image during test time. Using the pose information along with other object attributes such as color, height, width etc., a decision about the similarity of a pair of images is taken.

Another technique for robust object recognition is to combine multiple metrics, as in PTL 2. In PTL 2, hand crafted features are extracted from a plurality of images. Hand crafted features refer to features which are optimized for a particular task. Next the features are input to a number of similarity functions such as Mahalanobis distance, Bhattacharya co-efficient, cosine similarity etc. Finally to combine them, a RankBoost algorithm is used. This gives high accuracy and combines the advantages of many metrics together.

In NPL 1, a neural network is used as a classifier. The input to the network is the image, a pose box, and a pose confidence score. A pose box is defined as a tight bounding box around the image such that no background is visible. This involves first finding the parts of the object for example hands, legs, face etc. of a person. Using the bounding box of each part, a new bounding box for the object is generated by concatenating the parts bounding boxes together.

The method in NPL 2 uses the camera viewpoint and the pose priors of different targets for non-overlapping cameras. Using various auto-calibration techniques, features such as camera parameters, ground plane, location and their confidence scores are extracted. These additional features are supplied along with the image as input to a classifier. This additional information provides a higher dimension feature space for classification and to solve the pose variation problem.

In PTL 3, an object detection system achieve improvement of precision when detecting an object, such as a pedestrian, by analyzing a photographed image. In PTL 4, an object detection device accurately detects an object from an input image whose posture changes with a small arithmetic operation quantity. A face image recognition apparatus in PTL 5 robust to face direction.

CITATION LIST

Patent Literature

[PTL 1]
United States Patent Application Publication No. 2017/0154212
[PTL 2]
United States Patent Application Publication No. 2007/0211938
[PTL 3]
Japanese Patent Application Laid-Open No. 2017-027176
[PTL 4]
Japanese Patent Application Laid-Open No. 2015-187769
[PTL 5]
Japanese Patent Application Laid-Open No. 2009-157767

Non Patent Literature

[NPL 1]
L. Zheng, Y. Huang, H. Lu, and Y. Yang, "Pose Invariant Embedding for Deep Person Re-identification," arXiv preprint, 2017, arXiv:1701.07732.
[NPL 2]
Y. J. Cho and K. J. Yoon, "Improving Person Re-identification via Pose-aware Multi-shot Matching," 2016 IEEE Conference on Computer Vision and Pattern Recognition (CVPR), 2016, pages 1354-1362.

SUMMARY OF INVENTION

Technical Problem

Object recognition task mainly involves two steps. One is feature extraction from the input image and the other is to match the features using a discriminative metric. However, it is often the case that the pose of the object in the plurality of image changes from one frame to another frame. This results in different features being extracted for the same object leading to very high intrapersonal variation in features. Hence these features are not robust enough for the recognition task. Hence we need a technique that will be able to extract pose robust features early on in the learning process and which can be used during the metric learning process as well.

The method disclosed in PTL 1 uses the pose information along with multiple other attributes such as clothes, color etc. to recognize an object. As long as more than 50% of the attributes are matching between a query image and a target image the algorithm will result in a match. However in case where the object is not human, but a general object which may not have many attributes, it is not possible to use this method such as criteria for object recognition.

The method disclosed in PTL 2 models the object using hand crafted features. This results in high performance for specific tasks only as the features are very specific for tasks. However, for general object recognition the features may not be well suited. An end to end process is more suited for recognition as the features are learnt automatically during the training process. Hence, this method does not apply to general object recognition.

The method disclosed in NPL 1 computes pose boxes, which are parts boxes concatenated together. This representation is highly robust to pose variation and to background as well. However, again, this method is not suitable for general object recognition. It assumes that the object to be recognized is composed of multiple parts each big enough to be detected. However, this may not be the case for objects such as cars etc.

The method disclosed in NPL 2 increases the input feature dimension using auto-calibration techniques to get camera parameters, ground plane, location etc. This method requires access to the camera information which may not be practical. For example in cases of surveillance, this information may not be legal to use. Hence we need a method which can handle pose variation without using camera geometry information.

Therefore, it is important to reduce the effect of the pose at the object recognition task. In PTL 3 to 5, reducing the pose probabilities is not described.

One of the objects of the present invention is to provide an image processing device, an image processing method, and an image processing program that is capable of reducing the effect of the pose or pose on the recognition score, the recognition label or the recognition ID.

Solution to Problem

An image processing device according to the present invention includes: extraction means which extracts sub patches from a given plurality of input images combined pose probabilities; filtering means which filters the extracted sub patches and the pose probabilities; and combining means which combines the filtered sub patches and the filtered pose probabilities.

An image processing method according to the present invention includes the steps of: extracting sub patches from a given plurality of input images combined pose probabilities; filtering the extracted sub patches and the pose probabilities; and combining the filtered sub patches and the filtered pose probabilities.

A computer-readable recording medium having recorded therein an image processing program according to the present invention that, when executed by a computer, extracts sub patches from a given plurality of input images combined pose probabilities, filters the extracted sub patches and the pose probabilities, and combines the filtered sub patches and the filtered pose probabilities.

Advantageous Effects of Invention

According to the present invention, it is able to reduce the effect of the pose or pose on the recognition score, the recognition label or the recognition ID.

DESCRIPTION OF EMBODIMENTS

The current invention has been designed to solve these above mentioned problems. In addition to the above described entities, other evident and obvious disadvantages that this invention can overcome will be clearly revealed from the detailed specification and drawings.

The overall approach to solving the technical problems discussed above, is summarized here. The object recognition performance is affected by the pose variation especially in case of practical every day scenes and hence needs to be handled. Given the location of the object of interest in a plurality of images, a number of scaled samples are generated. From these scaled samples pose aware features are extracted. The pose aware feature takes into consideration the pose of the object while computing the features. This is done by using the pose probabilities computed by a pose estimator. The pose probabilities are integrated into the features with the help of learned filters. Next, using feature matching on the extracted features a score can be obtained for comparing the plurality of images, and the image with the highest score is selected as the correct match.

First Exemplary Embodiment

Hereinafter, a first exemplary embodiment of the present invention will be described in detail.

Figure 1:
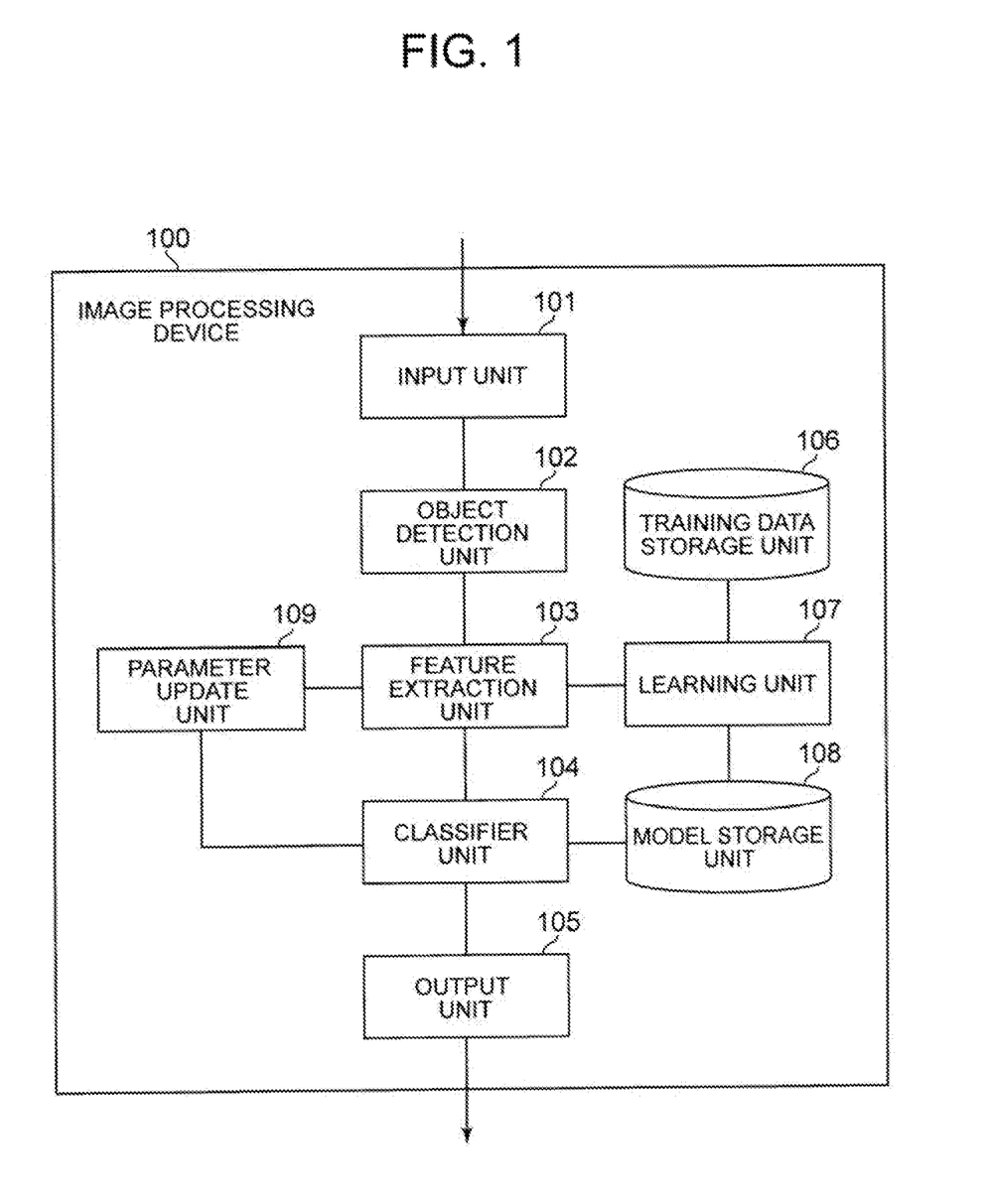
FIG. 1 is a block diagram showing an example of a structure of an image processing device 100 in stage 1 of the training phase according to a first exemplary embodiment of the present invention.

FIG. 1 is a block diagram showing an example of a structure of an image processing device 100 in stage 1 of the training phase according to the first exemplary embodiment of the present invention. With reference to FIG. 1, the image processing device 100 includes an input unit 101, an object detection unit 102, a feature extraction unit 103, a classifier unit 104, an output unit 105, a training data storage unit 106, a learning unit 107, a model storage unit 108, and a parameter update unit 109.

The input unit 101 receives a series of frames or images, for example, frames of a video, still images or the like, in the learning phase or before the learning phase. In the following description, the frames and a frame in the frames may be referred to as "images" and an "image" respectively. The training frames and a training frame in the training frames are referred to as "training images" and a "training image" respectively.

The object detection unit 102 detects a region of interest i.e. an object, such as a face or one of other objects which may include several parts, in the frames. The object detection unit 102 detects the object from a given image or a plurality of images. In the following explanation, the object detection unit 102 detects a person in the frame. The object detection unit 102 provides the location of the person in the frame, i.e. the x and y co-ordinates of the upper-left and lower-right bounding box. The object detection unit 102 may also store the center, width and height of the bounding box.

The feature extraction unit 103 is used to extract the features from the region of interest that are provided to the feature extraction unit 103 by the object detection unit 102. The feature extraction unit 103 obtains the features from the region of interest which is the output of the object detector.

Using the location provided by the object detection unit 102, scaled samples are generated. These samples are then normalized to lie in the same co-ordinate system. The coordinates are defined in a coordinate system set in advance in the frames. Finally, the features are extracted from these sample images. These features can be a combination of edge, texture, color, temporal, spatial and/or other higher level information or other lower level information from the image samples.

The learning unit 107 learns the model by one or more series of training frames. More specifically, the learning unit 107 learns the model which will be used for computing the pose of the samples, by features extracted from training frames. The learning unit 107 may compute the mean vector and the covariance matrix from the features of the samples as part of the parameter learning for the model. The learning unit 107 may also compute the gradient of the object detector output with respect to the input image. The learning unit 107 can also be a combination of learning units including not only learning model parameters but data parameters like mean, variance etc. and other parameters such as gradient of a network (or part of a network), other higher level parameters, or other lower level parameters for model learning.

The model essentially captures the distribution of the features of the scaled samples. More specifically the model captures the likelihood of an image pixel to belong to a particular label, which has been output by the object detector. The object detector maximizes its output score such that the given input image matches the desired label. In our case the model should be learned from this input data and generate a probability or a score.

The classifier unit 104 is used to for computing this probability or this score. In the training phase however, the classifier unit 104 is trained to compute the object class or the label score given the ground truth data. In the testing phase the classifier unit 104 is able to extract this probability information without using any ground truth data.

The training data storage unit 106 stores the images and their labels or their IDs used for training by the classifier unit 104, the object detection unit 102 and the learning unit 107. The data can be stored in the form of a single unit, a pair of data units or a triplet of data units. In the case of a single data unit the image and its label or its ID is stored. In the case of pair or triplet, a pair of images or three images are stored along with a binary label indicating the similarity of the pair images or the triplet images. The stored binary label indicates for example '+1' for similar images and '−1' for dissimilar images.

The model storage unit 108 stores the parameters of the various models such as the classifier unit 104, the object detection unit 102 and the learning unit 107. The parameters are the learnt weights of the various models such as the classifier unit 104, the object detection unit 102, the learning unit 107 in the training phase or the learning phase. These parameters or weights can be shared or independent from each other.

The parameter update unit 109 selects the direction and step size needed for updating the parameters of the various models such as the classifier unit 104, the object detection unit 102 and the learning unit 107. The updated parameters are computed in the training phase or the learning phase by minimizing a loss function. Different strategies can be used for updating the parameters such as Newton method, Adagrad, Gradient Descent etc.

The output unit 105 outputs the final target image or the ID. The output unit 105 may plot predetermined marks representing the ID on the frame at some predetermined positions represented by the x, y coordinates and the scale (width, height) of the object bounding box in the output frame with the plotted marks.

Figure 2:
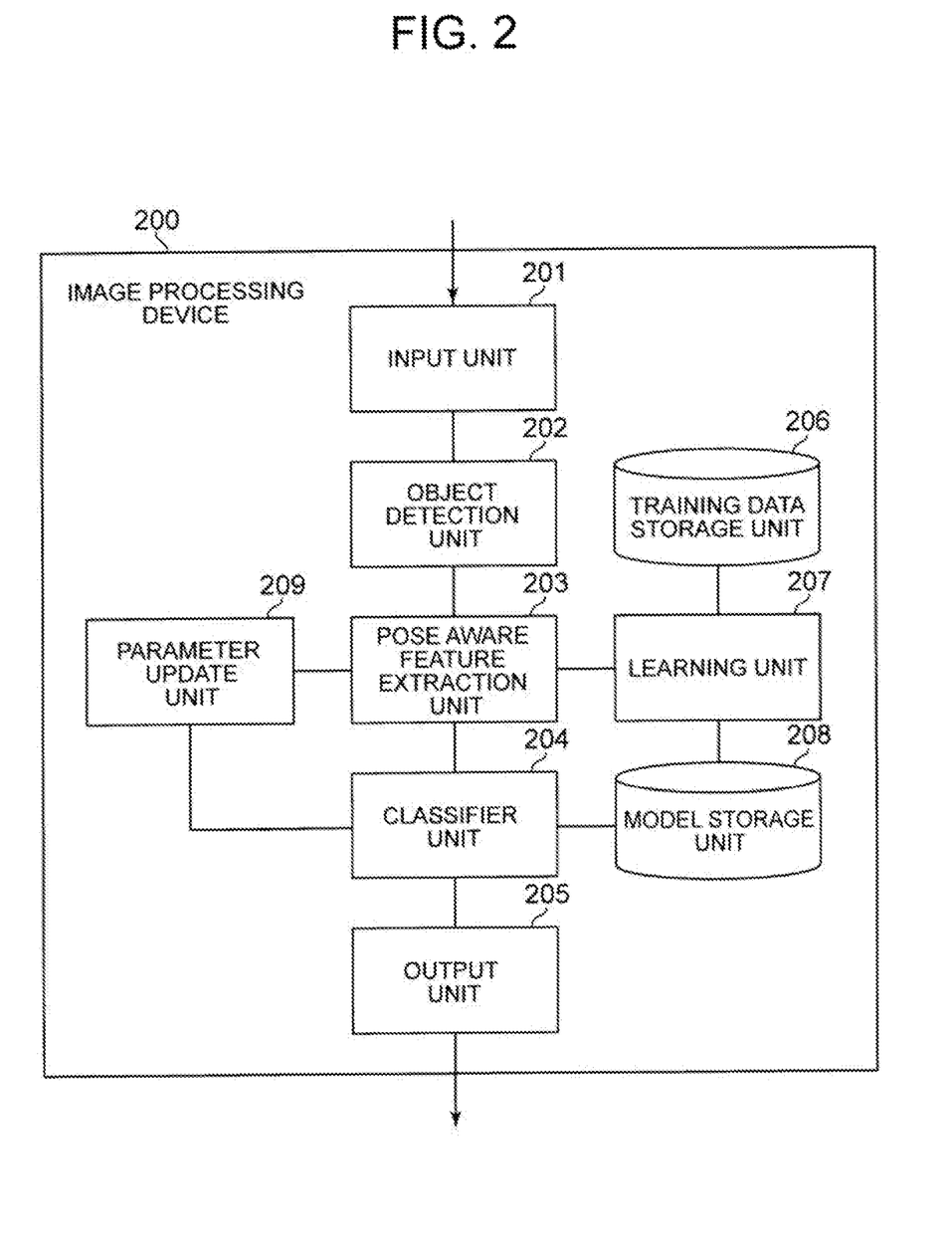
FIG. 2 is a block diagram showing an example of a structure of an image processing device 200 in stage 2 of the training phase according to a first exemplary embodiment of the present invention.

Next, an operation of the image processing device 200 in the training phase or the learning phase, according to the first exemplary embodiment will be explained in detail with reference to figures.

FIG. 2 is a block diagram showing an example of a structure of an image processing device 200 in stage 2 of the training phase according to the first exemplary embodiment of the present invention. With reference to FIG. 2, the image processing device 200 includes an input unit 201, an object detection unit 202, a pose aware feature extraction unit 203, a classifier unit 204, an output unit 205, a training data storage unit 206, a learning unit 207, a model storage unit 208, and a parameter update unit 209.

The image processing device 100 and it's parts are used for person classification (person ID), but the image processing device 200 and it's parts are used for pose classification (0 degree, 30 degree, 60 degree, 90 degree etc.). They can be same in design (i.e. they can be neural network, logistic regression etc.), but input, output and purpose are different in each devices.

The pose aware feature extraction unit 203 is used to extract the features from the region of interest that are provided to the pose aware feature extraction unit 203 by the object detection unit 202. Unlike the feature extraction unit 103, the pose aware feature extraction unit 203 takes into consideration the pose of the object. The pose aware feature extraction unit 203 computes the features of the object given its pose probabilities and the region of interest.

Pose of the object is incorporated along with the features using learned filter weights of the learning unit 207. These features can be additionally combined to edge, texture, color, temporal, spatial and/or other higher level information or other lower level information from the image samples.

The classifier unit 204 predicts the probabilities of the pose of the object in the plurality of images, and recognizes the object given its pose aware features.

In the training phase, an image processing device 100 and an image processing device 200 work independently. The image processing device 100 works as a person classifier, i.e. input is an image of a person and output is the ID of the person. The image processing device 200 works as a pose classifier, i.e. input is an image of a person and output is the pose in which the person is standing (0 degree, 30 degree, 60 degree, 90 degree etc.). In the testing phase, the features of the image processing device 100 and the image processing device 200 are combined to get better feature descriptors. The combined features can be used for example in a distance function to measure the similarity of two features from two persons.

Figure 3:
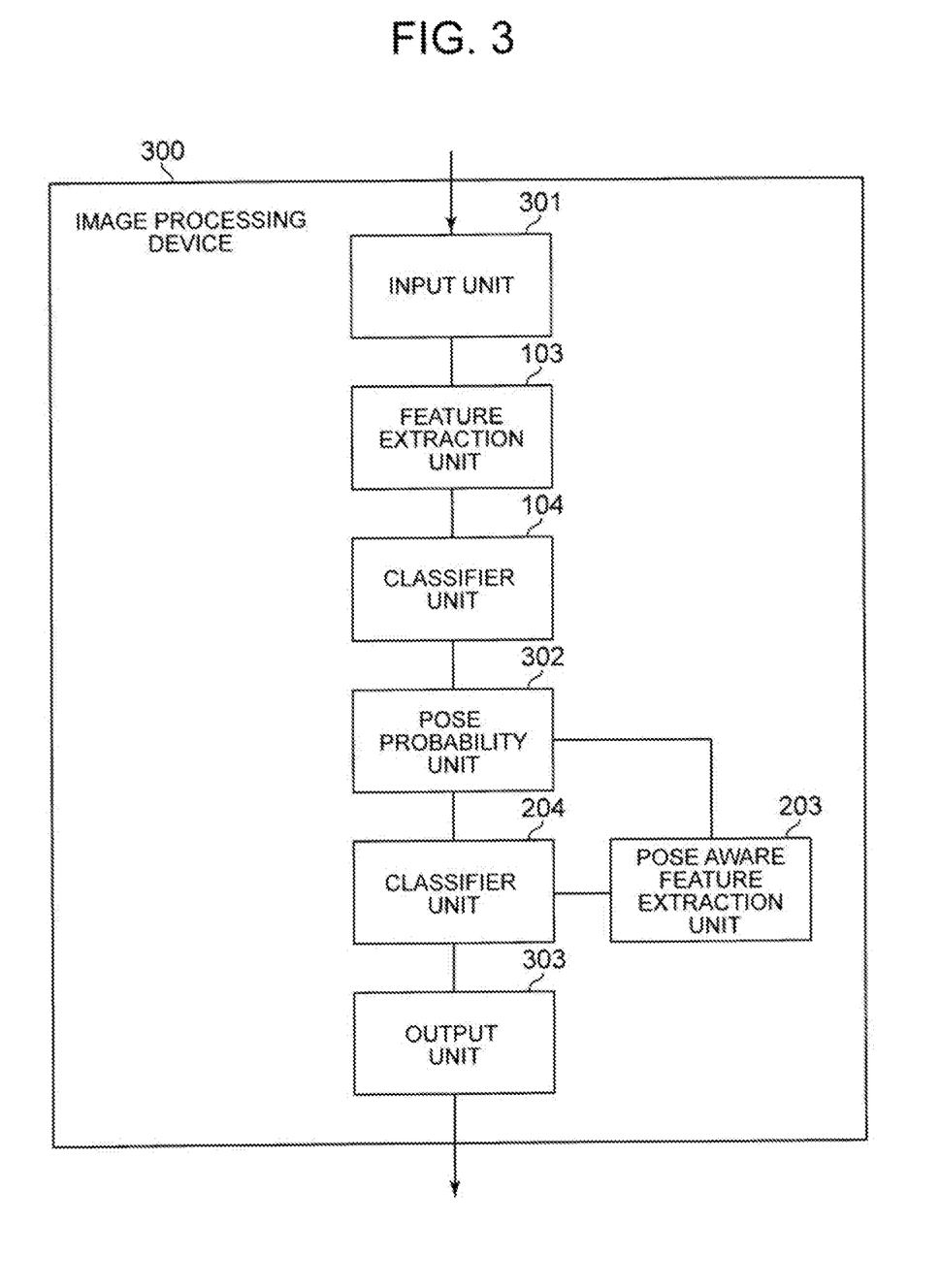
FIG. 3 is a block diagram showing an example of a structure of an image processing device 300 in the testing phase according to a first exemplary embodiment of the present invention.

Next, an operation of the image processing device 300 in the testing phase, according to the first exemplary embodiment will be explained in detail with reference to figures.

FIG. 3 is a block diagram showing an example of a structure of an image processing device 300 in the testing phase according to the first exemplary embodiment of the present invention. With reference to FIG. 3, the image processing device 300 includes an input unit 301, a feature extraction unit 103, a classifier unit 104, a pose probability unit 302, a pose aware feature extraction unit 203, a classifier unit 204, and an output unit 303.

The pose probability unit 302 is used to compute the vector of pose probabilities on the basis of the output of the classifier unit 104. The pose probabilities can be the histogram of valid poses for an object. This can include the pitch angle, the yaw angle, and the roll angle for the object. The poses can also include the poses of individual parts of the object.

Figure 4:
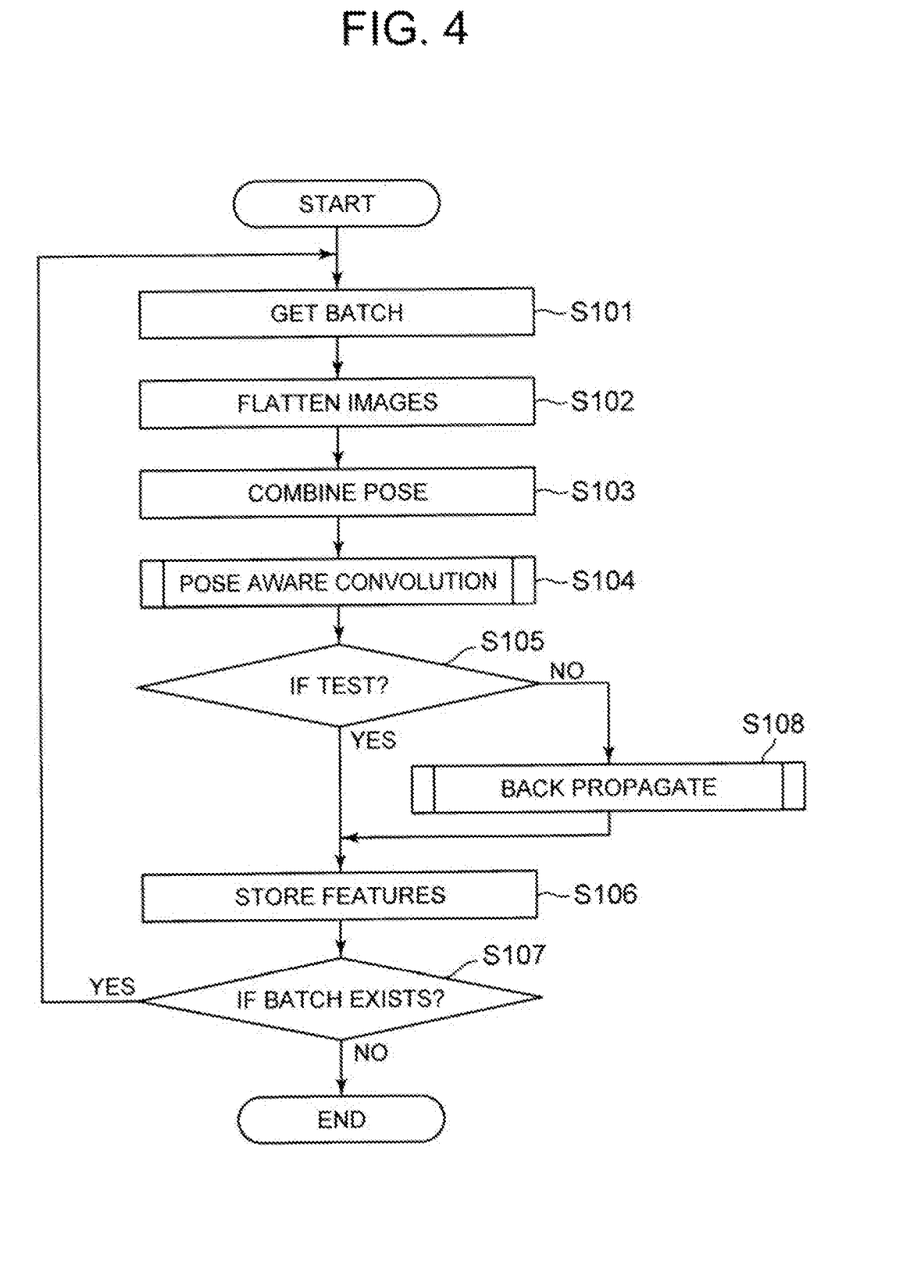
FIG. 4 is a flowchart showing an example of the operation of the image processing device 100, the image processing device 200 and the image processing device 300 according to the first exemplary embodiment of the present invention.

Next, an operation of the image processing device 100, the image processing device 200 and the image processing device 300 according to the first exemplary embodiment will be explained in detail with reference to figures.

FIG. 4 is a flowchart showing an example of the operation of the image processing device 100, the image processing device 200 and the image processing device 300 according to the first exemplary embodiment of the present invention.

The operation of the image processing device 100, the image processing device 200 and the image processing device 300 according to the first exemplary embodiment of the present invention can be broadly divided into a training phase (learning phase) and a testing phase (evaluation phase). In this paragraph an overview of the flowchart of the exemplary embodiment will be described with reference to FIG. 4.

The recognition of the object begins by detection of object in an image or a frame. The input to the system (Step S101) is a batch of images and the poses of the object along with their corresponding label or ID for processing. The images are flattened into a vector form for easier processing i.e. made from multidimensional arrays to single dimensional arrays by rolling or any other vectorization process (Step S102).

The flattened images and their poses are combined (Step S103). In the testing phase, the pose probabilities for each of the images in the batch, computed from the pose probability unit 302 are combined to the flattened images in Step S103. The combination is one method for merging the pose probabilities with the image according to the first exemplary embodiment of this invention. Other ways of merging the flattened images and their poses can also be used easily and are obvious.

The combined input is now used to compute the features, specifically the pose aware convolution features. Next, "pose aware convolution" to extract pose aware features is performed (Step S104). If the phase of operation is the testing phase or the evaluation phase (Yes in Step S105), then the computed features are stored in Step S106. If the phase of operation is the training phase or the learning phase (No in Step S105), backpropagation is done (Step S108).

Backpropagation is one of the ways for training and learning the parameters of the different models by computing the updates of each of the parameters such as classifier models, feature extractors etc. Other methods will be apparent to those skilled in the arts. Finally if all the target batches have been processed (No in Step S107), then the processing is finished. If all the target batches have not been processed (Yes in Step S107), the process is restarted for the next batch.

The pose aware convolution processing will be explained in detail later along with the drawings in FIG. 5. The following is a brief description of the pose aware convolution unit. This unit computes the features of an input image using the pose of the object in the image. The pose guides the feature extraction process.

Figure 5:
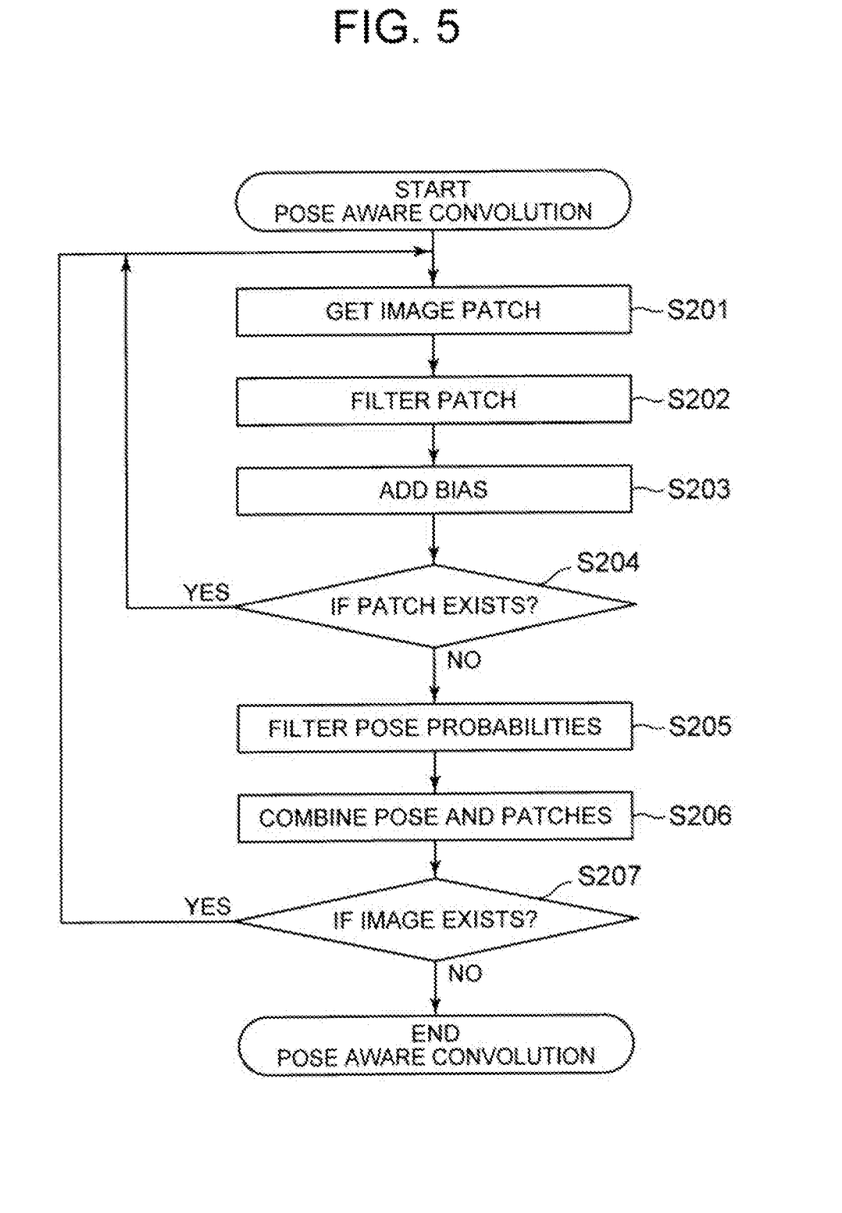
FIG. 5 is a flowchart showing an example of the operation of the image processing device 200 and the image processing device 300 according to the first exemplary embodiment of the present invention in the pose aware convolution processing phase.

FIG. 5 is a flowchart showing an example of the operation of the image processing device 200 and the image processing device 300 according to the first exemplary embodiment of the present invention in the pose aware convolution processing phase. FIG. 5 is a flowchart showing an example of an operation of the pose aware feature extraction unit 203 of the image processing device 200 and the image processing device 300.

Given the input image and pose probabilities concatenated together in Step S201 is used to extract small sub patches from the input. The patch is filtered using the current weights or the learned weights of the model of the classifier unit 204 in Step S202. Next, the bias term is added to the resultant filtered patch output (Step S203).

If there are more patches in the image (Yes in Step S204) then the new patches are taken and processed by Steps S201, S202, and S203. If there are no more patches (No in Step S204) then the pose probabilities are filtered next by the classifier unit 204 in Step S205. The filtered poses and the filtered image patches are then combined together by using the features extracted from the feature extraction unit 103 in Step S206. The combination can be as simple as adding them together, or can be done by using more complex methods.

If anymore images exists then pose aware convolution process is repeated for each of the images (Yes in Step S207). If no images exists the pose aware convolution process is ended (No in Step S207). The pose aware convolution is explained in more detail below:

[Math. 1]

$$\bar{x} = \frac{1}{N} \sum_{i=1}^{N} x_i \quad \text{Equation (1)}$$

In the Equation (1), a left member is the mean or the average of the image pixel values. It is used for normalizing the input before the actual pose aware convolution feature extraction procedure. The '$x_i$' is the intensity of the $i^{th}$ pixel and 'N' is the total number of image pixels.

[Math. 2]

$$V = \frac{1}{N} \sum_{i=1}^{N} (x_i - \bar{x})^2 \quad \text{Equation (2)}$$

In the Equation (2), 'V' is the variance of the image pixel intensities. Using these two equations we can normalize the input to have zero mean and unit variance. The normalization is done by using the following equation:

[Math. 3]

$$x_i = \frac{(x_i - \bar{x})}{V} \quad \text{Equation (3)}$$

After the inputs have been normalized they are processed according to the Equation (4) below.

[Math. 4]

$$f_{ij} = \sum_{i=1}^{K} \sum_{j=1}^{K} \sum_{c=1}^{C} w_{ijc} x_{i_0+i, j_0+j, c} + b_c + \sum_{u=1}^{D} w_u p_u \quad \text{Equation (4)}$$

The Equation (4) explains the pose aware convolution feature extraction process concretely according to the first exemplary embodiment of the present invention. Here '$f_{ij}$' is the pose aware convolution feature from the $i^{th}$, $j^{th}$ position of the input. The learnable filters '$w_{ijc}$' and '$w_u$' are the parameters for filtering the image patches and the pose probabilities vector '$p_u$'. The image patches are given by '$x_{i_0+i, j_0+j, c}$' entered at '$i_0, j_0$'. Here 'i,j' are the filter coefficient indexes, 'c' is the channel index, 'u' is the pose index and 'b' is the bias term.

The first advantageous effect of the present exemplary embodiment is that it is able to identify the object accurately and reduce the effect of the pose variation on the recognition score.

Other advantageous effects of the present exemplary embodiment will be explained as follows. The advantage of the present exemplary embodiment is that, multiple metrics or matching functions can still be used with this method. Another advantageous effect of the present invention is that the model parameter does not require handcrafted features since the algorithm can be trained end to end i.e. start from an image and end with an object ID, label or matching score. Also, heavy optimization techniques such as latent support vector machines are not needed and hence real time operation is also possible. Moreover, rigid shapes and non-rigid shapes can also be recognized. Furthermore, exemplars for changes in shape, pose and parts are not needed.

Second Exemplary Embodiment

Figure 6:
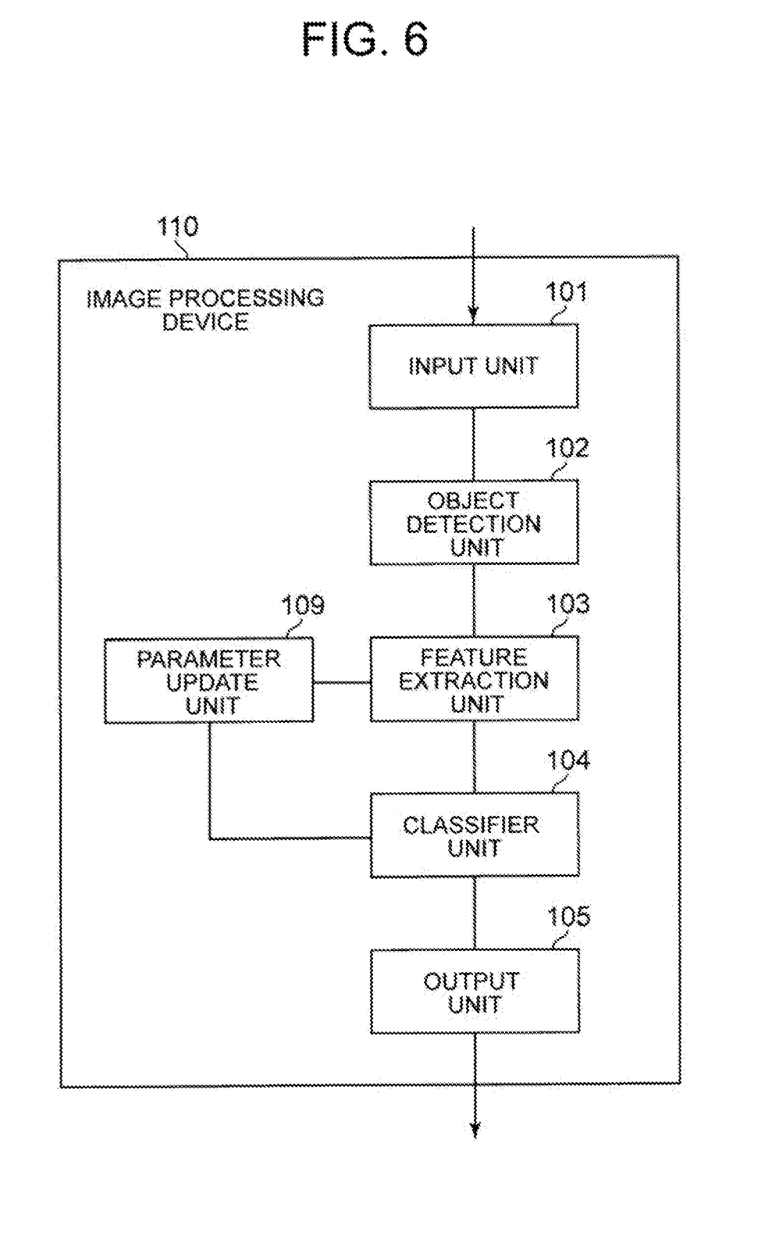
FIG. 6 is a block diagram showing an example of a structure of an image processing device 110 in stage 1 of the training phase according to a second exemplary embodiment of the present invention.

Next, a second exemplary embodiment of the first stage of the present invention will be described in detail with reference to drawings.

FIG. 6 is a block diagram showing an example of a structure of the image processing device 110 in stage 1 of the training phase according to the second exemplary embodiment of the present invention. With reference to FIG. 6, the image processing device 110 includes: an object detection unit 102 which detects region of the object; a feature extraction unit 103 which extracts features from an image on the basis of a region of interest; a classifier unit 104 which generates the object label, ID, matching score or matching probability of the input image; a parameter update unit 109 which is used for updating the parameters or weights of the model during the learning phase. The model can be updated offline i.e. the model can be trained once and used many times, or the model can be updated online i.e. the model can be retrained as and when needed.

Figure 7:
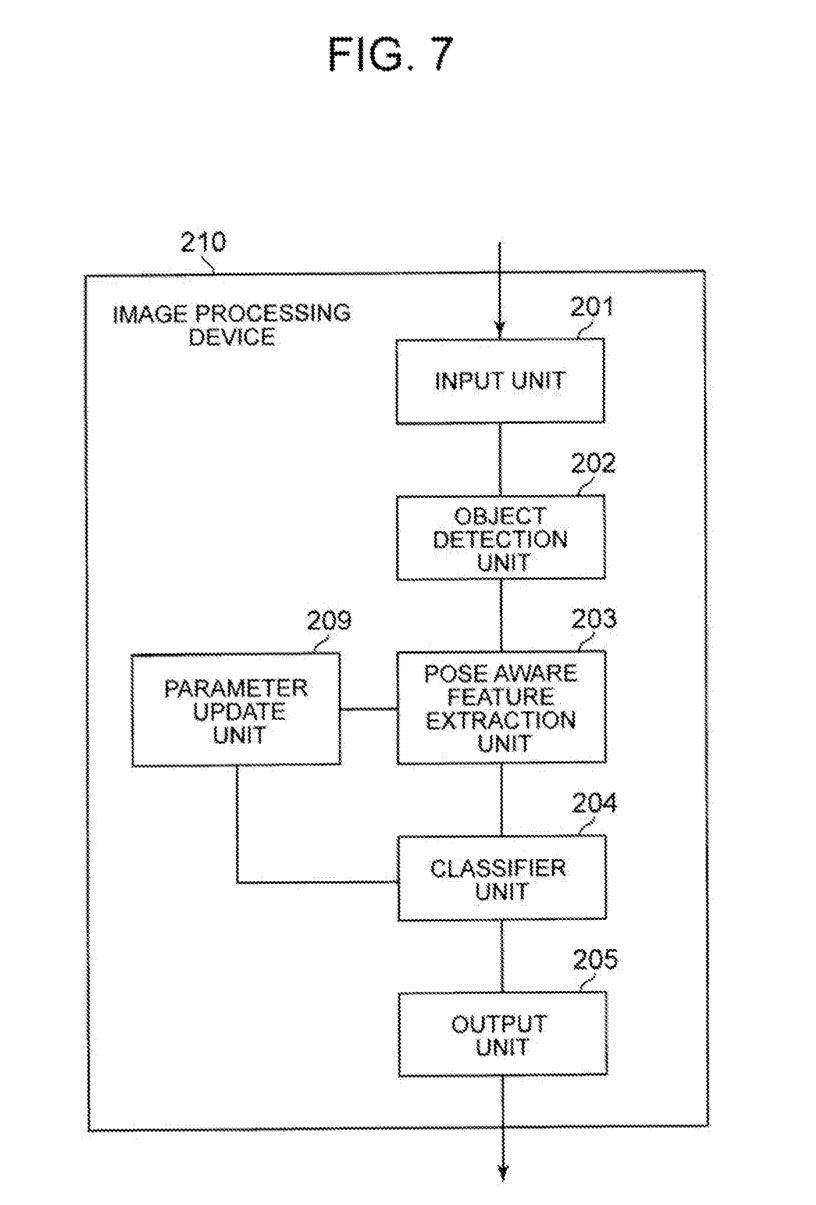
FIG. 7 is a block diagram showing an example of a structure of an image processing device 210 in stage 2 of the training phase according to a second exemplary embodiment of the present invention.

Next, a second exemplary embodiment of the second stage of the present invention will be described in detail with reference to drawings.

FIG. 7 is a block diagram showing an example of a structure of the image processing device 210 in stage 2 of the training phase according to the second exemplary embodiment of the present invention. With reference to FIG. 7, the image processing device 210 includes: an object detection unit 202 which detects region of the object; a pose aware feature extraction unit 203 which extracts pose aware features from an image on the basis of a region of interest; a classifier unit 204 which generates the object label, ID, matching score or matching probability of the input image; a parameter update unit 209 which is used for updating the parameters or weights of the model during the learning phase. The model can be updated offline i.e. the model can be trained once and used many times, or the model can be updated online i.e. the model can be retrained as and when needed.

The second exemplary embodiment has the same advantageous effect as the first advantageous effect of the first exemplary embodiment. The reason that the advantageous effect is the same as that of the first advantageous effect of the first exemplary embodiment is because the fundamental principal is the same in both embodiments.

One of the objectives of the present invention is to provide an image processing device that is capable of recognizing objects efficiently and reducing the effect of pose variation on the accuracy. The accurate and robust object recognition can be realized by the image processing device.

An image processing device according to one of the exemplary aspects of the present invention includes: an object detection means which detects the object from a given image or a plurality of given images; a feature extraction means which obtains the features from the region of interest which is the output of the object detector; a pose classifier means which predicts the probabilities of the pose of the object in the plurality of images; a pose aware feature extractor means which computes the features of the object given its pose probabilities and the region of interest; an object classifier means which recognizes the object given its pose aware features; and a feature matching means which obtains the similarity between a given target image and a probe image and selecting the target with the maximum similarity score as the final output.

The main advantage of the present invention is that it is able to reduce the effect of pose variation on the similarity score, label or ID of the object recognition task. This can be achieved because of the addition of the pose probability vector along with the input images. This vector is used to learn additional convolutional kernels which help in computing pose awareness features.

Another advantageous effect of the present invention is that it can be used for general object recognition i.e. special object with information of multiple attributes like color, size, shape etc. is not needed. Unlike PTL 1, this invention can be used to reduce the pose variation of any object irrespective of other object information availability.

An additional advantageous effect of the present invention is that this invention does not require any hand crafted feature extraction unlike PTL 2. Handcrafted features limit the applicability of the technique and decreases generalizability. This invention can be utilized with any technique which requires pose awareness.

An additional advantageous effect of the present invention is that unlike NPL 1 there is no need for the object to have additional parts. Since in NPL 1 pose boxes are computed which require object and its parts to be detected separately. This invention does not assume any parts information.

Another advantageous effect of the present invention is that there is no need for camera calibration and geometry information unlike NPL 2. The object is directly estimated and used for correction. No need for any additional information which makes this invention less expensive to deploy.

Another advantageous effect of the present invention is that it is an end to end model i.e. given a plurality of images, this method can directly give the output without any intermediate steps.

Moreover, the image processing device 100, the image processing device 200, and the image processing device 300 may include a feature matching means which obtains the similarity between a given target image and a probe image and selecting the target image with the maximum similarity score as the final output.

Moreover, the image processing device 100, the image processing device 200, and the image processing device 300 may include a pose correction means which applies the transform to the input object region of interest so as to normalize the pose to a standard pose template.

Other Exemplary Embodiment

Each of the image processing device 100, the image processing device 200, the image processing device 300, the image processing device 110, and the image processing device 210 can be implemented using a computer and a program controlling the computer, dedicated hardware, or a set of a computer and a program controlling the computer and a dedicated hardware.

Figure 8:
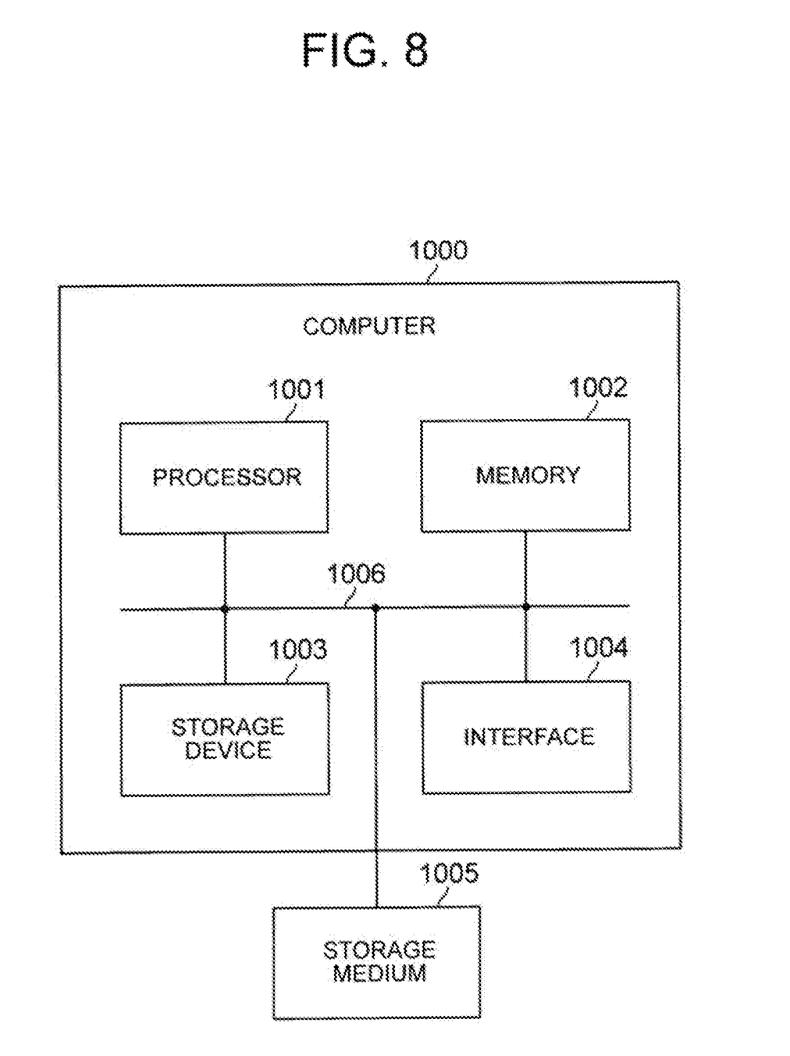
FIG. 8 is a block diagram showing an example of a hardware structure of a computer 1000 which is able to realize the image processing device according to the exemplary embodiments of the present invention.

FIG. 8 is a block diagram showing an example of a hardware structure of a computer 1000 which is able to realize the image processing device according to the exemplary embodiments of the present invention. FIG. 8 shows an example of a hardware structure of a computer 1000 which is able to realize the image processing device 100, the image processing device 200, the image processing device 300, the image processing device 110, and the image processing device 210 which are described above.

With reference to FIG. 8, the computer 1000 includes a processor 1001, a memory 1002, a storage device 1003 and an interface 1004, which are communicably connected via a bus 1006. The computer 1000 can access a storage medium 1005. Each of the memory 1002 and the storage device 1003 may be a storage device, such as a RAM (Random Access Memory), a hard disk drive or the like. The storage medium 1005 may be a RAM, a storage device such as a hard disk drive or the like, a ROM (Read Only Memory), or a portable storage medium. The storage device 1003 may operate as the storage medium 1005. The processor 1001 can read data and a program from the memory 1002 and the storage device 1003, and can write data and a program in the memory 1002 and the storage device 1003.

The processor 1001 can communicate with a server (not illustrated) which provides frames for the processor 1001, a terminal (not illustrated) to output the final output shape, and the like over the interface 1004. The processor 1001 can access the storage medium 1005. The storage medium 1005 stores a program that causes the computer 1000 operates as the image processing device 100, the image processing device 200, the image processing device 300, the image processing device 110, or the image processing device 210.

For example, the processor 1001 loads the program, which causes the computer 1000 operates as the image processing device 100 or the image processing device 110, stored in the storage medium 1005 into the memory 1002. The processor 1001 operates as the image processing device 100 or the image processing device 110 by executing the program loaded in the memory 1002.

The input unit 101, the input unit 201, and the input unit 301, the object detection unit 102 and the object detection unit 202, the feature extraction unit 103, the pose aware feature extraction unit 203, the learning unit 107 and the learning unit 207, the classifier unit 104 and the classifier unit 204, the pose probability unit 302, the parameter update unit 109 and the parameter update unit 209, the output unit 105, the output unit 205, and the output unit 303 can be realized by a dedicated program that is loaded in the memory 1002 from the storage medium 1005 and can realize each of the above-described units, and the processor 1001 which executes the dedicated program.

The model storage unit 108 and the model storage unit 208, the training data storage unit 106 and the training data storage unit 206 can be realized by the memory 1002 and/or the storage device such as a hard disk device or the like. A part of or all of the input unit 101, the input unit 201, and the input unit 301, the object detection unit 102 and the object detection unit 202, the feature extraction unit 103, the pose aware feature extraction unit 203, the learning unit 107 and the learning unit 207, the classifier unit 104 and the classifier unit 204, the pose probability unit 302, the parameter update unit 109 and the parameter update unit 209, the output unit 105, the output unit 205, and the output unit 303 can be realized by a dedicated circuit that realizes the functions of the above-described units.

As a final point, it should be clear that the process, techniques and methodology described and illustrated here are not limited or related to any particular apparatus. It can be implemented using a mixture of components. Also various types of general purpose device may be used in accordance with the instructions herein. The present invention has also been described using a particular set of examples. However, these are merely illustrative and not restrictive. For example the described software may be implemented in a wide variety of languages such as C, C++, Java (registered trademark), Python (registered trademark) and Perl etc.

Moreover other implementations of the inventive technology will be apparent to those skilled in the art.

Figure 9:
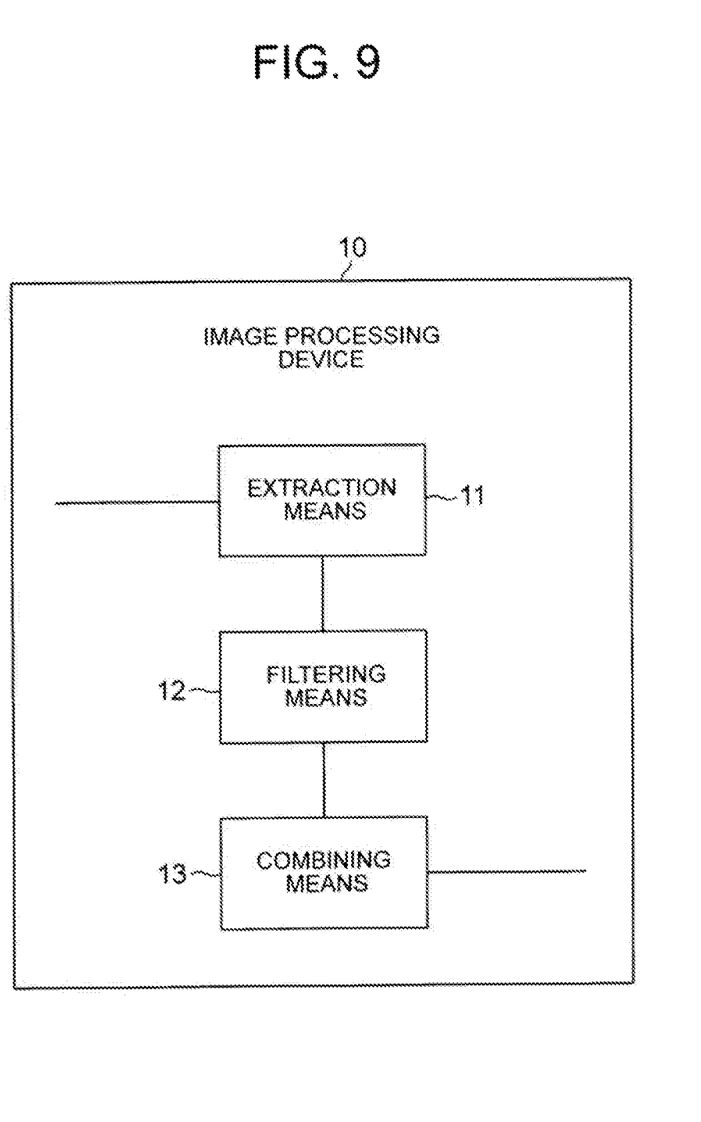
FIG. 9 is a block diagram showing an outline of an image processing device according to the present invention.

An outline of the present invention will be described below. FIG. 9 is a block diagram showing an outline of an image processing device according to the present invention. An image processing device 10 according to the present invention includes: an extraction means 11 (the pose aware feature extraction unit 203, for example) which extracts sub patches from a given plurality of input images combined pose probabilities; a filtering means 12 (the classifier unit 204, for example) which filters the extracted sub patches and the pose probabilities; and a combining means 13 (the pose aware feature extraction unit 203, for example) which combines the filtered sub patches and the filtered pose probabilities.

With the structure, the image processing device can reduce the effect of the pose or pose on the recognition score, the recognition label or the recognition ID.

Further, the filtering means 12 may compute probabilities of each ID or each label from the given plurality of input images and their features.

With the structure, the image processing device can estimate each ID of input images more accurately.

Further, the image processing device 10 may include a feature matching means which obtains similarities between a plurality of given target image features and a plurality of samples of probe image features and selects the probe sample image with the maximum similarity as the final output.

With the structure, the image processing device can estimate each ID and each pose of input images.

Further, the image processing device 10 may include a pose estimator means (the pose probability unit 302, for example) which generates a histogram of pose probabilities of the given plurality of input images.

With the structure, the image processing device can estimate each pose of input images more accurately.

Further, the image processing device 10 may include an object detection means (the object detection unit 202, for example) which generates regions of interest of an object in the given plurality of input images and a class or a label of the object, and a pose aware feature extraction means (the pose aware feature extraction unit 203, for example) which obtains features which are pose awareness from each of the generated regions.

With the structure, the image processing device can recognize the object in input images more accurately.

Further, the image processing device 10 may include a pose correction means which applies a transform to an input object region of interest so as to normalize a pose to a standard pose template.

With the structure, the image processing device can accelerate the process of the object recognition.

Further, the image processing device 10 may include a feature normalization means (the pose aware feature extraction unit 203, for example) which re-normalizes features after the pose correction means applies the transform.

With the structure, the image processing device can normalize the process of the object recognition.

Further, the image processing device 10 may include a learning means (the learning unit 207, for example) which learns models used for computing poses of samples by one or more series of training samples which may contain a pair of a target image and a probe image, a label indicating whether they are the same object or not.

Further, the image processing device 10 may include a regularization means which regulates changes in parameters or weights learned during a training phase.

Further, the image processing device 10 may include a parameter updating means (the parameter update unit 209, for example) which updates parameters of the learned model and decays older weights and biases.

Further, the image processing device 10 may include a scale space generation means (the object detection unit 102, for example) which obtains scaled samples of an image from a given region of interest.

With the structure, the image processing device can estimate each ID and each pose of input images more accurately.

While the present invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

10, 100, 110, 200, 210, 300 image processing device
11 extraction means
12 filtering means
13 combining means
101, 201, 301 input unit
102, 202 object detection unit
103 feature extraction unit
104, 204 classifier unit
105, 205, 303 output unit
106, 206 training data storage unit
107, 207 learning unit
108, 208 model storage unit
109, 209 parameter update unit
203 pose aware feature extraction unit
302 pose probability unit
1000 computer
1001 processor
1002 memory
1003 storage device
1004 interface
1005 storage medium
1006 bus

What is claimed is:

1. An image processing device comprising:
   an extraction unit, implemented by a processor, which extracts sub patches from a given plurality of input images based on pose probabilities;
   a filtering unit, implemented by the processor, which filters the extracted sub patches and the pose probabilities; and
   a combining unit, implemented by the processor, which combines the filtered sub patches and the filtered pose probabilities.

2. The image processing device according to claim 1,
   wherein the filtering unit computes probabilities of each ID or each label from the given plurality of input images and features of the given plurality of input images.

3. The image processing device according to claim 2, further comprising:
   a feature matching unit, implemented by the processor, which obtains similarities between a plurality of given target image features and a plurality of samples of probe image features and selects a probe sample image with a maximum similarity as a final output.

4. The image processing device according to claim 2, further comprising:
a pose estimator unit, implemented by the processor, which generates a histogram of pose probabilities of the given plurality of input images.

5. The image processing device according to claim 2, further comprising:
an object detection unit, implemented by the processor, which generates regions of interest of an object in the given plurality of input images and a class or a label of the object; and
a pose aware feature extraction unit, implemented by the processor, which obtains features related to pose awareness from each of the generated regions.

6. The image processing device according to claim 2, further comprising:
a pose correction unit, implemented by the processor, which applies a transform to an input object region of interest so as to normalize a pose to a standard pose template.

7. The image processing device according to claim 1, further comprising:
a feature matching unit, implemented by the processor, which obtains similarities between a plurality of given target image features and a plurality of samples of probe image features and selects a probe sample image with a maximum similarity as a final output.

8. The image processing device according to claim 7, further comprising:
a pose estimator unit, implemented by the processor, which generates a histogram of pose probabilities of the given plurality of input images.

9. The image processing device according to claim 7, further comprising:
an object detection unit, implemented by the processor, which generates regions of interest of an object in the given plurality of input images and a class or a label of the object; and
a pose aware feature extraction unit, implemented by the processor, which obtains features which are pose awareness from each of the generated regions.

10. The image processing device according to claim 1, further comprising:
a pose estimator unit, implemented by the processor, which generates a histogram of pose probabilities of the given plurality of input images.

11. The image processing device according to claim 10, further comprising:
an object detection unit, implemented by the processor, which generates regions of interest of an object in the given plurality of input images and a class or a label of the object; and
a pose aware feature extraction unit, implemented by the processor, which obtains features which are pose awareness from each of the generated regions.

12. The image processing device according to claim 1, further comprising:
an object detection unit, implemented by the processor, which generates regions of interest of an object in the given plurality of input images and a class or a label of the object; and
a pose aware feature extraction unit, implemented by the processor, which obtains features which are pose awareness from each of the generated regions.

13. The image processing device according to claim 1, further comprising:
a pose correction unit, implemented by the processor, which applies a transform to an input object region of interest so as to normalize a pose to a standard pose template.

14. The image processing device according to claim 13, further comprising:
a feature normalization unit, implemented by the processor, which re-normalizes features after the pose correction unit applies the transform.

15. The image processing device according to claim 1, further comprising:
a learning unit, implemented by the processor, which learns models used for computing poses of samples by one or more series of training samples which may contain a pair of a target image and a probe image, a label indicating whether they are the same object or not.

16. The image processing device according to claim 15, further comprising:
a regularization unit, implemented by the processor, which regulates changes in parameters or weights learned during a training phase.

17. The image processing device according to claim 15, further comprising:
a parameter updating unit, implemented by the processor, which updates parameters of the learned model and decays older weights and biases.

18. The image processing device according to claim 1, further comprising:
a scale space generation unit, implemented by the processor, which obtains scaled samples of an image from a given region of interest.

19. An image processing method, the method comprising:
extracting sub patches from a given plurality of input images based on pose probabilities;
filtering the extracted sub patches and the pose probabilities; and
combining the filtered sub patches and the filtered pose probabilities.

20. A non-transitory computer-readable recording medium having recorded therein an image processing program that, when executed by a computer, performs an image processing method, the image processing method comprising:
extracting sub patches from a given plurality of input images based on pose probabilities;
filtering the extracted sub patches and the pose probabilities; and
combining the filtered sub patches and the filtered pose probabilities.

* * * * *